INVENTORS
THOMAS H. GALSTER
ALLEN M. HITCHCOCK
GORDON P. TAILLIE

INVENTORS
THOMAS H. GALSTER
ALLEN M. HITCHCOCK
BY GORDON P. TAILLIE

ATTORNEYS

March 10, 1970  T. H. GALSTER ET AL  3,499,374
XEROGRAPHIC PRINTER
Filed March 1, 1965  6 Sheets-Sheet 4
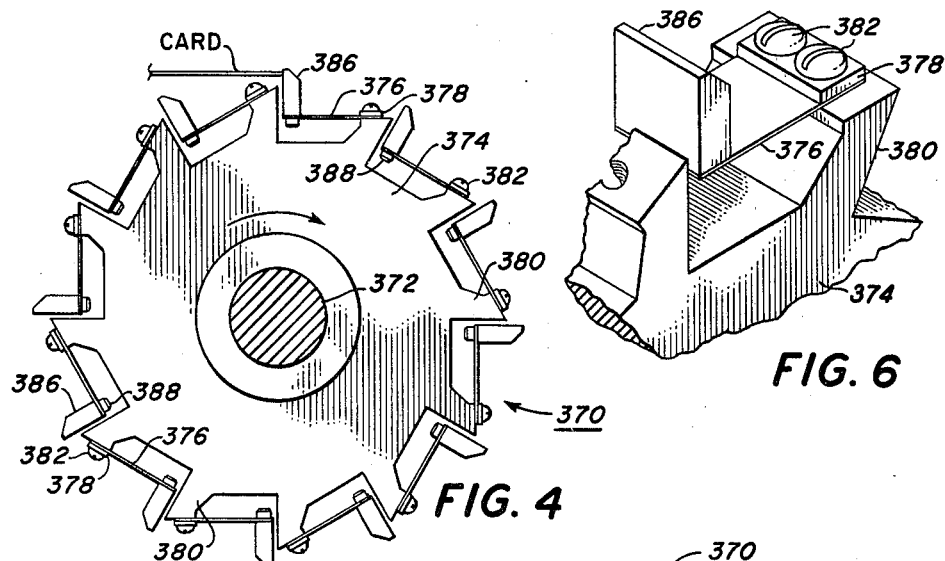
FIG. 4
FIG. 6
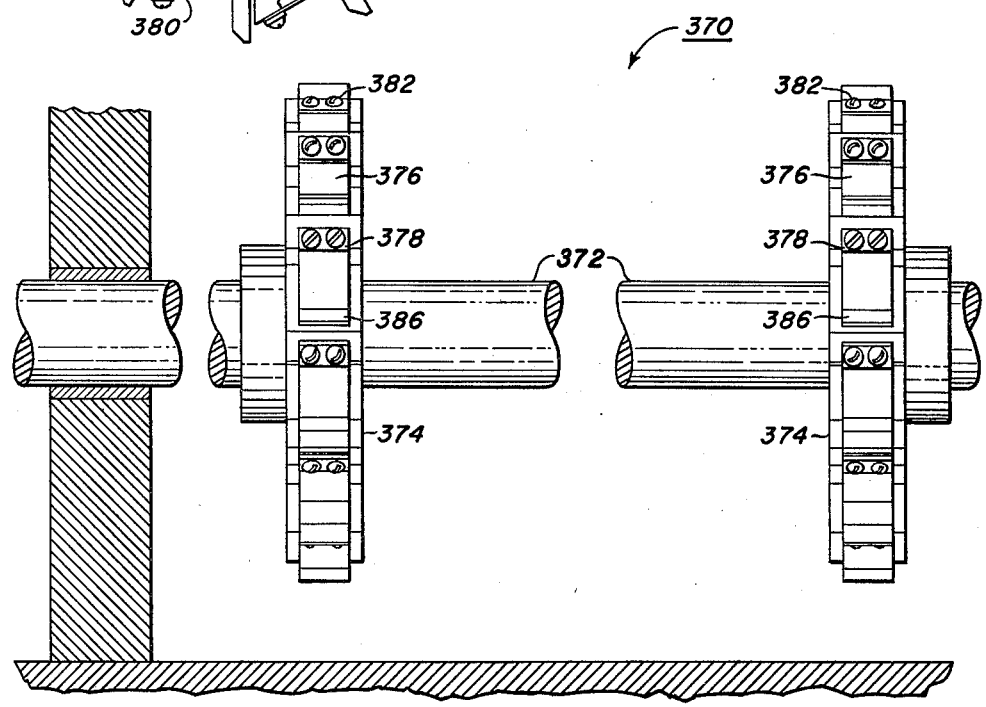
FIG. 5
INVENTORS
THOMAS H. GALSTER
ALLEN M. HITCHCOCK
GORDON P. TAILLIE
BY
ATTORNEYS

INVENTORS
THOMAS H. GALSTER
ALLEN M. HITCHCOCK
GORDON P. TAILLIE

ATTORNEYS

United States Patent Office 3,499,374
Patented Mar. 10, 1970

3,499,374
XEROGRAPHIC PRINTER
Thomas H. Galster, Syracuse, Allen M. Hitchcock, Palmyra, and Gordon P. Taillie, Rochester, N.Y., assignors to Xerox Corporation, Rochester, N.Y., a corporation of New York
Filed Mar. 1, 1965, Ser. No. 436,168
Int. Cl. G03g 13/22
U.S. Cl. 355—3                            4 Claims

ABSTRACT OF THE DISCLOSURE

Apparatus for conforming a data processing card to the surface of a xerographic drum during the transfer step including a plurality of continuous strands held in contact with the drum surface.

---

This invention relates to xerographic reproducing machines and specifically to machines to reproduce xerographic images on data processing cards.

More particularly, the invention pertains to an apparatus for recording visual information in convenient compact form which may be easily stored, handled and reproduced in its original form. Visual information has previously been stored on microfilm mounted in data processing cards, or so-called aperture cards, so that exact reproductions of the visual information are preserved on the microfilm, and coding information can be applied to the cards for storing and retrieving purposes. Applicant's invention consists of apparatus which will store the visual information on data processing cards without the intermediate microfilm which is costly and time consuming to process. The apparatus reproduces images of the visual information directly onto the surface of the data processing cards by xerographic techniques and immediately provides a convenient means for handling and storing the information which has the same advantages as the aperture cards containing microfilm frames and does not have the inherent disadvantages associated with the use of microfilm.

Apparatus constructed in accordance with the invention produces cards containing reproduced images which are immediately available to the operator to observe the image without the time consuming and costly development processes associated with microfilm. Also, the image is of a size sufficient for viewing without an enlarger; thus the reproduced image may be immediately checked for quality of image. Further, duplicate copies of the reproduced image may be quickly and conveniently produced so that one set of images may be immediately placed in permanent storage and another set of images used in current files.

When using microfilm mounted in aperture cards, it is necessary to prepunch the aperture card, mount a film support member in the aperture of the card and mount the developed film in the aperture of the card. These steps are eliminated by the present invention. The image is placed directly on the opaque card without any aperturing or any intermediate mounting of films.

The image on the microfilm is usually reduced 12 to 15 times from its original size. When the image is reproduced directly on the card by the present invention, there is a larger area available for image use; thus, the image is reduced 2.5 to 3 times its original size. This increase in size of the reproduced image simplifies the optical systems needed in all apparatus associated with the process. For example, the optical system needed in the original reduction of the image is simpler and less expensive. The machines used to produce new copies from the reproduced images are also simpler and less expensive, and viewers or readers used to observe images after they are reduced are simpler, smaller and less expensive.

It is therefore the primary object of this invention to reproduce xerographic images of visual material onto the surface of data processing cards.

It is a further object of this invention to improve xerographic apparatus to print images of original documents on the surface of cards at a reduced size.

It is a further object of this invention to store visual information on the surface of the cards without using photographic film.

It is a further object of this invention to simplify the apparatus used in the production of data processing cards containing images of visual information.

These and other objects of this invention are attained by means of a xerographic apparatus which will accept one or more documents properly aligned, scan the documents and expose a xerographic drum to a reduced image of the documents and transfer the reduced images after development to the surface of data processing cards.

For a better understanding of the invention as well as other objects and further features thereof, reference is had to the following detailed description of the invention to be read in connection with the acompanying drawings, wherein:

FIG. 4 is a side view of the card timing device used with the card conveying system shown in FIG. 3;

FIG. 5 is a front view of the card timing device used with the card conveyor shown in FIG. 3;

FIG. 6 is an enlarged detail isometric view of the card timing blades used on the card timer shown in FIG. 4;

Figure 1:
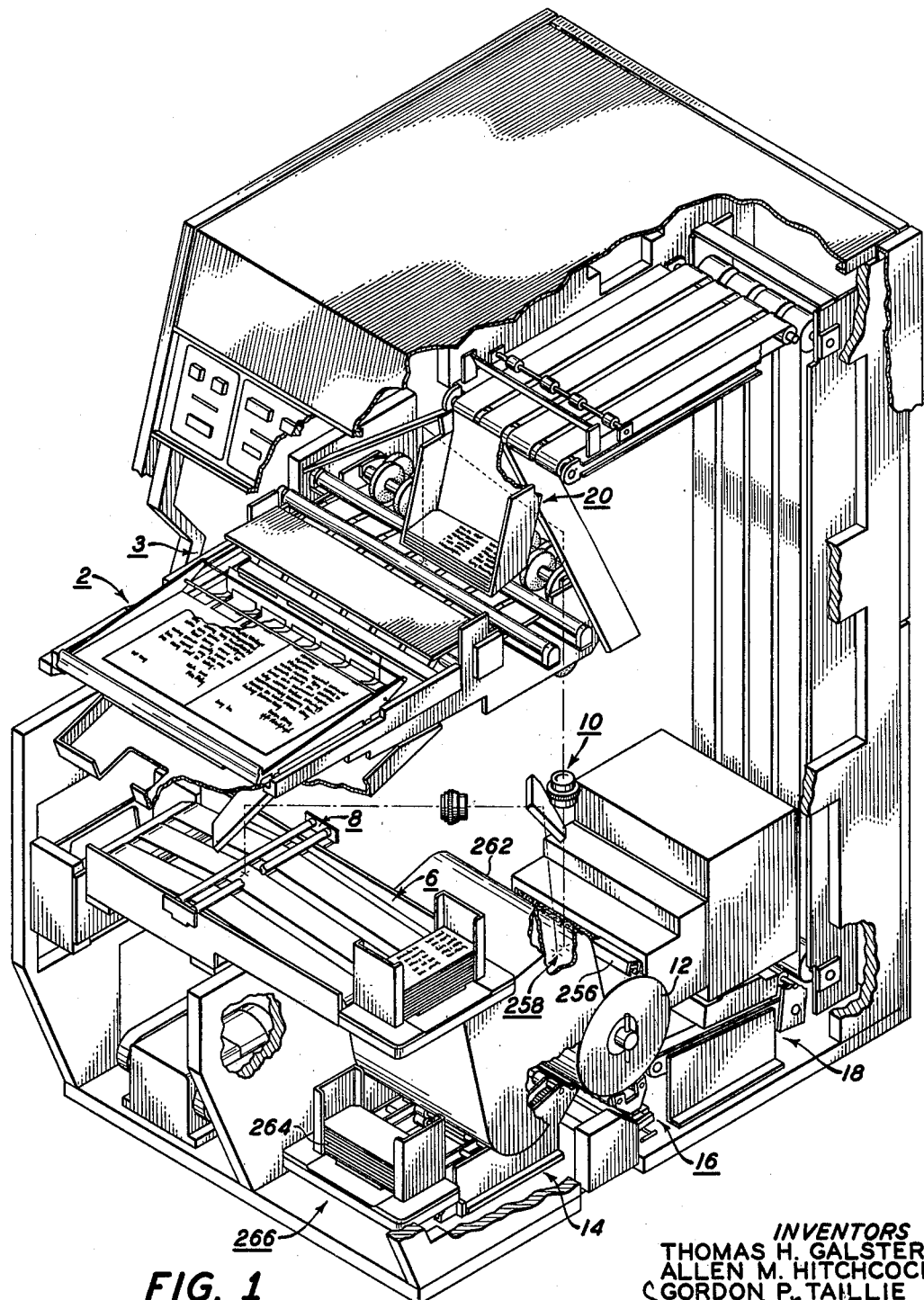
FIGURE 1 is an isometric view of an automatic xerographic machine constructed in accordance with the present invention and having portions broken away to show internal structure.
Figure 2:
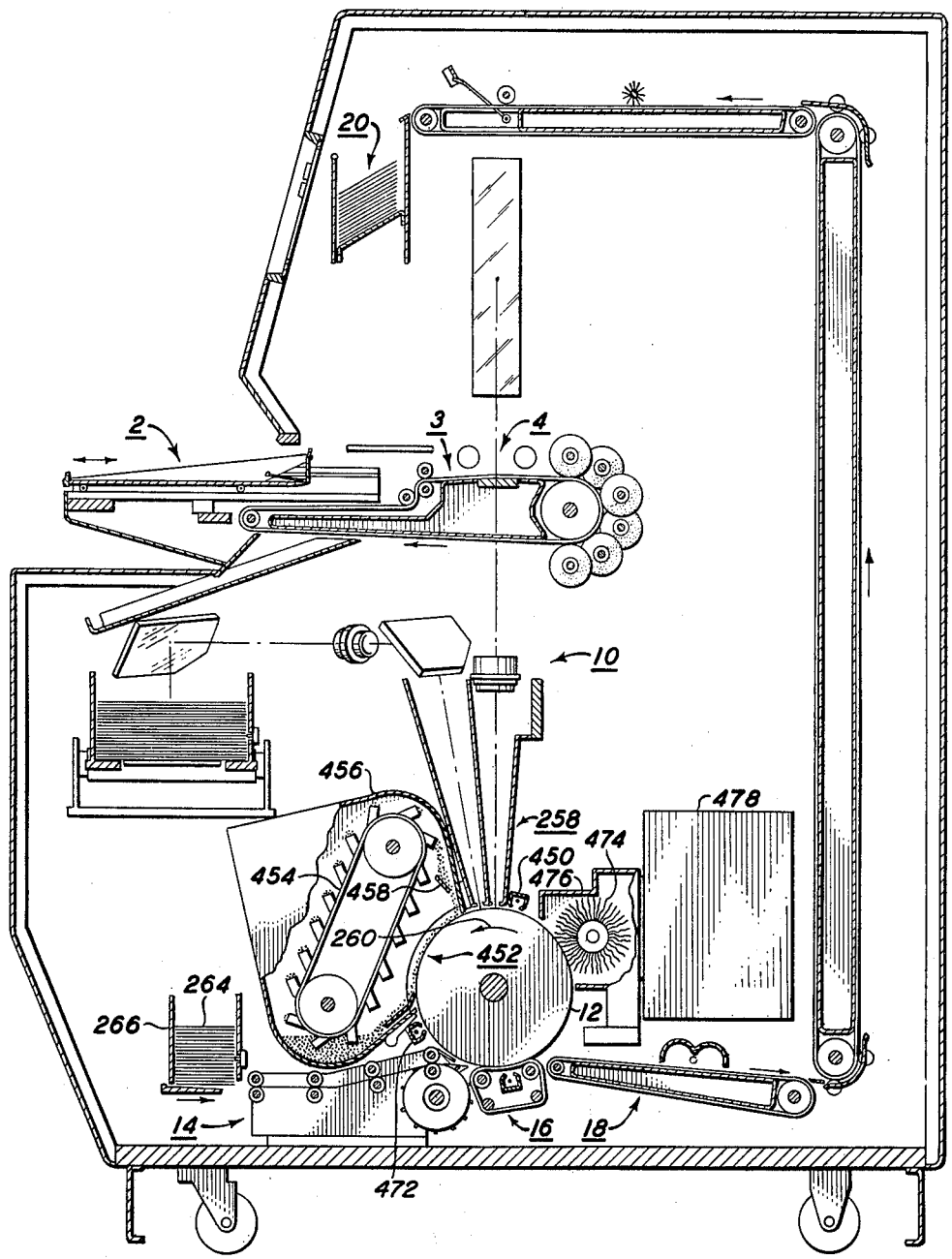
FIG. 2 is a schematic right side view of the machine shown in FIG. 1.

FIGURES 1 and 2 illustrate the overall machine used to reproduce reduced images xerographically onto data processing cards. A document tray, generally designated 2, feeds original documents to advancement conveyor 3 and document scanning station 4. A card conveyor, generally designated 6, is used to transport cards containing images thereon past a card scanning station 8. Light images of the material to be reproduced are directed from the scanning stations 4 and 8 through an optical system, generally designated 10, to xerographic drum 12. Blank data processing cards or the like are fed by means of conveyor system 14 into contact with the xerographic drum 12 at a transfer station 16 and deposited on a card conveyor system 18. The cards containing images of the reproduced copy are deposited in a card hopper 20 at the top of the machine over the document tray 2.

The xerographic drum 12 has a photoconductive surface which is an effective insulator in the dark and conductive when exposed to light. An electrostatic charge is uniformly placed over the surface of the xerographic drum by a corotron 256. The charge remains on the surface of the drum as the drum rotates to the exposure station 258. The light images of either of the documents being scanned at scanning station 4 or cards being scanned at scanning station 8 discharges the electrostatic charge on the surface of the xerographic drum in areas where the drum is exposed to light from the reflected images. The areas which are not exposed to light retain the electrostatic charge which is then in image configuration of the copy being reproduced. As the drum rotates in the direction of the arrow 260, the latent electrostatic image produced on the drum at the exposure station 258 is developed into a powder image means of a developer system enclosed in developer housing 262. The xerographic process of charging, exposing and developing is well known in the art and does not require a detailed description herein. However, the developer system, as enclosed by the housing 262, is the conventional type of cascade developing wherein particles of toner or powder are carried by glass beads referred to as carrier particles and cascaded over the drum surface. The toner or powder is attracted to the drum surface by the electrostatic charge which is on the drum in image configuration. Thus, a powder image of the copy being scanned at scanning station 4 or 8 is reproduced on the drum surface.

Blank cards are fed from a stack 264 in a card feeding hopper 266 to the card conveyor 14. As can be best seen in FIGURE 3, the card transport system 14 is made up of a pair of side frame plates 268 mounted in parallel relation on the main frame of the machine and spaced apart by a base plate 270. Mounted on the base plate 270 between the side frame 268 are a pair of parallel card guide plates 272. The guide plates 272 each consist of two members 274 and 276. The lower member 276 is secured to the base plate 270, and the upper guide plate 274 is supported by and spaced from the side plates 268 by a series of spacer bars 278. A slot 280 is formed between the plates 274 and 276 of a size sufficient to permit passage of cards moving through the transport system. The front end of the slot 280 is flared to receive cards from the feed hopper 266. The cards emerge from the slot 280 just prior to the xerographic drum 12 and are directed into contact with the drum by means of a deflection plate 282, supported from the side frames 268 above the end of the slot and a pair of adjustable guides 284 mounted on the inside of each of the lower guide plates 276. The guides 284 may be adjusted upward or downward to change the angle of exit of the cards from the slot 280.

The whole transport assembly 14 is adjustable relative to the drum 12 and the card feeder 266. The side frames 268 are held to the main frame of the machine by means of removable clamps 286 which engage flanges on the inside of the frame plates. Flanges 288, on the outside of the frame plates 268, abut positioning screws 290 which pass through an adjustment block 292 on the main frame. The adjusting screw 290 is locked in position once the transport system is properly adjusted by a lock nut 294.

As a card is fed from the hopper 266, the leading edge enters the flared end of the guide slot 280 and extends between a first feed roll 296 and idler roll 298 mounted on a pair of shafts 302 and 304, respectively. The shaft 304 containing the idler rollers 298 is rotatably mounted in elongated slots 306 in the lower guide plates 276. A leaf spring 308, secured to a flange 310 on the base plate 270, presses against the shaft 304 forcing the shaft upward in the elongated slots against the feed rollers 296. The shaft 302 extends through the upper guide plates 274 and is journaled in the side frame plates 268. The shaft 302 is driven by a motor MOT–1 through a gear box 312, timing belt 314 and a pulley 360, mounted on the end of the shaft 302.

As a card is forced between the feed roller 296 and the idler roller 298, it is driven forward by the feed roller into the guide slot 280 towards a second set of feed and idler rollers 318 and 320, respectively. The idler roller 320 is mounted on a shaft 322 journaled in slots in the lower guide plate 276 in the same manner as the shaft 304. A leaf spring 324 urges the shaft 322 upward so that the idler roller 320 presses against the feed roller 318. The feed roller 318 is mounted on a shaft 326 which extends through the upper guide plate 274 and is journaled in the side frame plates 268. One end of the shaft 326 extends through one of the side frame plates 268 and has a pulley 328 mounted thereon for driving engagement with a belt 330, as described below. The card is moved forward by the feed rollers 318 to th next set of feed rollers 332 on shaft 334 and idler rollers 336 on shaft 338. The shafts 334 and 338 are mounted in the same manner as the guide for shafts 322 and 326. The shaft 338 is urged upward by a leaf spring 340 so that the idler rollers 336 press against the feed rollers 332. The shaft 334 also extends through the side frame plate 268 and has a pulley 342 mounted thereon for engagement with the belt 330. The card is moved forward by the feed roller 332 in the slot 280 so that it engages the last set of feed rollers 344 and idler rollers 346. The rollers 344 and 346 are mounted on shafts 348 and 350, respectively. The shafts 348 and 350 are mounted in the same manner as the shafts 302 and 304, and the shaft 350 is urged upward so that the rollers 346 contact the rollers 348 by a leaf spring 352. A pulley 354 is mounted on one end of the shaft 348 in driving engagement with a belt 356 which transmits power to the other feed rollers, as described below. On the other end of the shaft 348 a pulley 358 is engaged by a belt (not shown).

The entire transport system 14 is driven from the main drive motor MOT–4 through the belt 360. The belt 360 drives the pulley 358 which in turn drives the shaft 348 and the rollers 344. Rotation of the shaft 348 provides the driving force for the feed rollers 318 and 332 through the pulley 354, the belt 356. The belt 356 drives a pulley 359, secured to an idler shaft 362. Also secured to the idler shaft 362 is a second pulley 364, which engages and drives the belt 330. The belt 330 passes around and drives the pulley 342 on the shaft 334 of the feed roller 332 and the pulley 328 on the shaft 326 of the feed rollers 318. The belt 330 is maintained in tension by two adjustable tensioning rollers 366 and 368.

Figure 3:
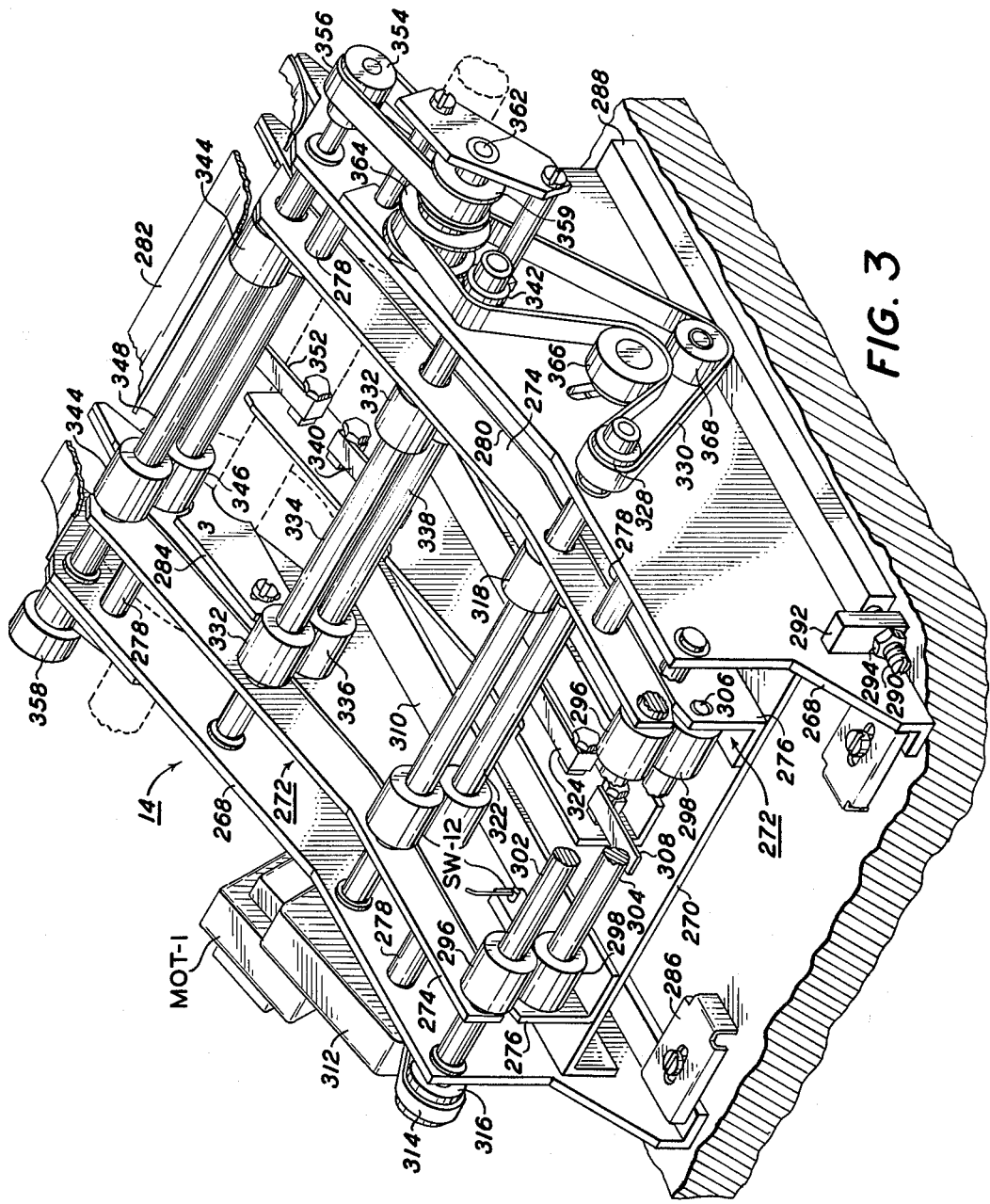
FIG. 3 is an isometric view of the main card conveyor of the machine shown in FIG. 1.

As the cards move along the guide slot 280 of the transport system 14, they encounter a card timing device shown in dotted lines in FIG. 3 and indicated generally as 370, and shown in more detail in FIGS. 4, 5, and 6. The timing apparatus 370 is mounted on a shaft 372 immediately beneath the transport system 14. The timing device 370 consists of two disc-shaped members 374 mounted on the shaft 372 and extending between the side frames 268 and the guide plates 272 of the transport system 14. Attached to the circumference of the disc member 374 is a leaf spring 376, as seen in detail in FIG. 7. The leaf spring is secured to extension 380 on the circumference of the disc member 374 by screws 382. The free end of the leaf spring 376 supports a card timing plate 386, secured to the spring by screws 388. The area between the extensions 380 is undercut to allow the card timing plates 386 to be deflected downward into the space between the extensions 380.

As a card is advanced by the feed rollers in the transport 14, the leading edge encounters one of the card timing plates 386 on each of the card timers 370. The feed rollers 344 are driving the card at a speed slightly faster than the linear movement of the plates 386, and the card is retarded in its movement so that a slight amount of slippage is produced between the feed rollers and the card. With the leading edge of the card abutting the card timing plate 386, the card cannot advance to the xerographic drum until the card timing plate has rotated to a point sufficient to permit passage of the card. With this type of arrangement, the timing of the card to the xerographic drum can be closely coordinated with the scanning of cards or documents in the scanning system. As the card timing assemblies 370 rotate, subsequent card timing plates 386 encounter the bottom of the card abutting one of the card timing plates and are deflected downward into the undercut areas between the extensions 380. The deflection downward and the return to their normal position after the card has passed is accomplished by the leaf spring 376.

Figure 8:
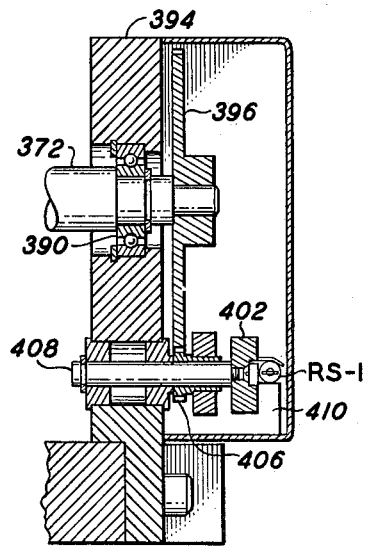
FIG. 8 is a left hand sectional view taken along lines 16—16 of FIG. 7.
Figure 7:
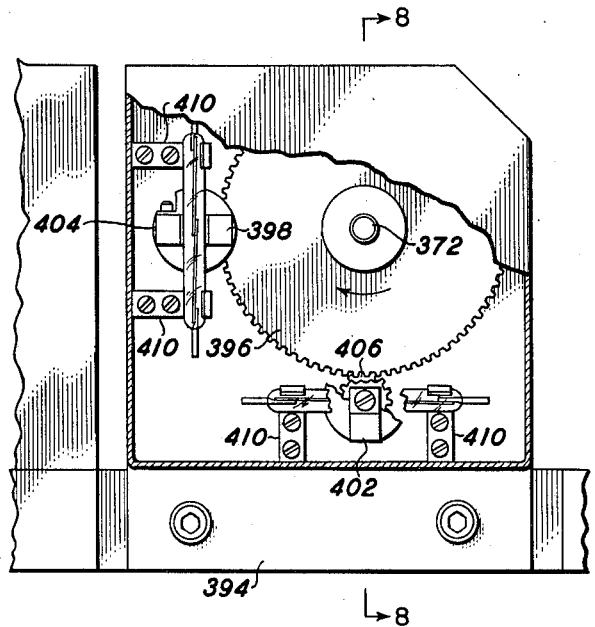
FIG. 7 is a right side view of the switch housing used with the card timer shown in FIG. 4 and having the side conveyor broken away to show internal structure.

The shaft 372, upon which the assemblies 370 are mounted, extends into a gear and switch housing 309, seen in detail in FIGS. 7 and 8. The shaft 372 is journaled in a bearing 392 mounted in a frame plate 394 making up one side of the housing 390. A gear 396 is secured to the end of the shaft 372 and rotates a pair of magnets 398 and 402, secured to gears 404 and 406, respectively. The gear 406 is mounted on a stub shaft 408 journaled in the frame plate 394, and the gear 404 is secured to the shaft journaled in the same manner, though not shown. As the shaft 372 rotates, the gear 396 drives the gears 404 and 406 at a speed twelve times the rotational movement of the shaft 372. The difference in speed between the shaft 372 and the rotation of the magnets 398 and 402 is equal to the number of card timing plates 386 on the card timing assemblies 370, in this case 12.

Figure 9:
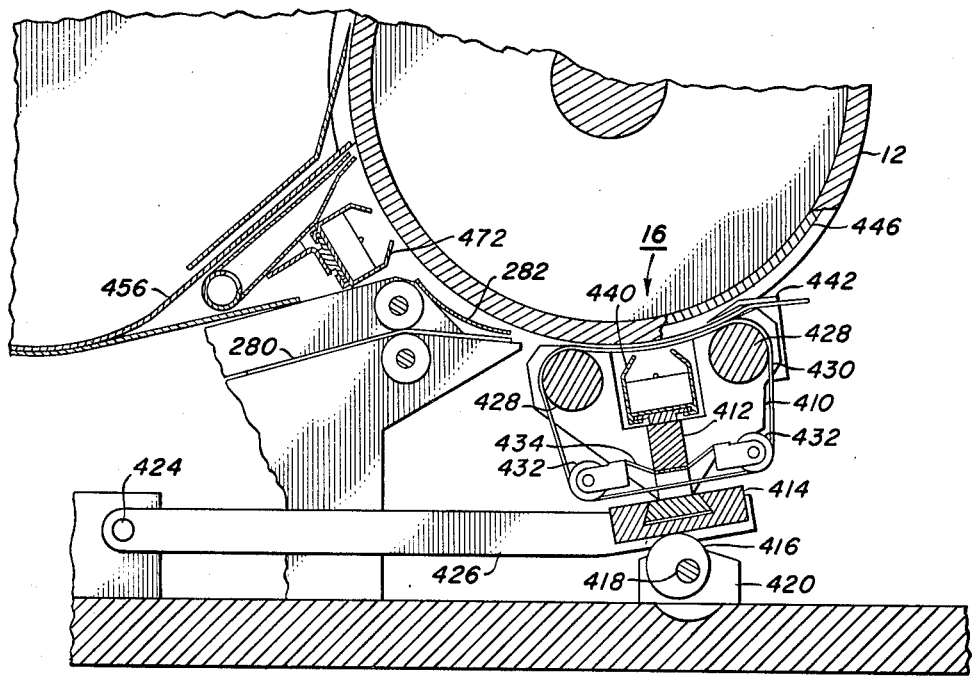
FIG. 9 is a sectional view of a portion of the drum and transfer station of the machine shown in FIG. 1.

Referring now to FIG. 9, it can be seen that a card emerging from the slot 280 in the transport system 14 is directed towards the transfer station 16 by means of the deflection plate 282. The transfer station 16 consists of a pair of Y-shaped support plates 410 mounted on each end of a cross member 412 which spans the xerographic drum 12. The cross member 412 dove tails into a follower block 414 which rides on a cam 416. The cam 416 is mounted on a shaft 418 supported in brackets 420 on the main frame. A handle 422, seen in FIG. 1, permits the rotation of the shaft 418 in the cam 416 to raise and lower the block 414 towards and away from the drum 12. The entire assembly 16 pivots about a point 424 on lever arm 426.

A pair of rollers 428 are mounted between the two support plates 410 to drive and guide a series of flexible strands 430. The strands 430 extend around the two rollers 428 and a pair of pressure rollers 432 which are rotatably mounted from a leaf spring 434 secured to an undercut portion of the cross member 412. The strands 430 are spaced along the rollers 428 to span the drum 12 and are forced into contact with the drum between the rollers 428 when the assembly 16 is urged upward by the cam 416. When a card is fed from the transport assembly 14 against the surface of the xerographic drum 12, it extends between the strands 430 and the drum and is carried forward by the strands 430 past the transport station. A transfer corotron 440 is supported by the cross member 412 in the center of the Y-shaped support plate 410 and also traverses the drum surface.

When a card is carried by the strands 430 in contact with the surface of the drum, it is in contact with a powder image previously developed on the drum surface. The powder image is transferred from the xerographic drum to the card by the application of an electrical charge from the corotron 440.

The width of the xerographic drum 12 is approximately the same size as the card on which material is to be printed. However, since printing does not appear on the entire surface of the card, one end of the drum is not coated with a photoconductor. This portion of the drum is undercut, as shown in FIG. 9, to allow a picker blade 442 to extend beneath the surface of the drum 12 and force cards, electrostatically tacked to the drum surface by the corotron 440, to be stripped away from the surface of the drum and deflected towards a conveyor belt system 18. The picker blade 442 is mounted just after the transfer assembly 16 with the leading edge of the blade extending into the undercut portion 446 of the drum 12 to a point slightly ahead of the point where the card leaves the transfer assembly 16. The transport assembly 18 is a vacuum type transport and pulls the card down on a series of conveyor belts 480 for transport of the card away from the drum 12.

In order to produce an image on the surface of the drum 12, a uniform electrostatic charge is placed on the drum surface by a corotron 450, as seen in FIG. 2. The drum surface is then exposed to a light image of copy to be reproduced from the optical system 10 and the photoconductive surface becomes conductive in areas where it is exposed to light thus discharging the electrostatic charge on the surface of the drum in those areas. The remaining charge on the drum surface is in image configuration of the copy being reproduced. As the drum rotates, the surface containing the electrostatic image moves into a developing area 452. The developer material consisting of toner particles and carrier beads is cascaded over the surface of the xerographic drum 12 to develop the image thereon. A bucket conveyor 454 picks up developer material from the bottom of the developer housing 456 and carries the developer material upwards to a point where it can be dumped onto a chute 458 which directs it onto the surface of the xerographic drum.

After the image is developed, a pretransfer corotron 472 places a charge on the surface of the powder image. This pretransfer charge tends to loosen the powder from the drum surface and improve the transfer characteristics of the powder image to improve transfer at station 16.

When the drum is rotated past the transfer station 16, it is cleaned of any residual powder by a brush cleaner 474 in a housing 476. Toner particles cleaned from the drum surface are evacuated from the brush 474 by an exhaust system indicated by 478.

After the cards from hopper 266 pass the transfer station 16, they are peeled from the xerographic drum by the blade 442 and directed down onto the surface of the discharge conveyor 18. Suitable means for driving rollers 428 as well as the other various movable components of the machine at the desired speeds are intended to be provided generally; however, for a full disclosure of the actual drive system of the machine reference can be had to copending application Ser. No. 436,027, filed Mar. 1, 1965, in the name of Gerard C. Wright, which has now issued as Patent No. 3,326,548.

While the invention has been described with reference to the structure disclosed herein, it is not confined to the details set forth; and this application is intended to cover such modifications or changes as may come within the purposes of the improvements or the scope of the following claims.

What is claimed is:

1. A xerographic reproducing apparatus for copying an image on data processing cards and the like, including
    a xerographic drum journaled for rotational movement,
    means to produce on the surface of the xerographic drum a powder image of copy being reproduced,
    a series of card feeding rollers positioned to carry cards into surface contact with the xerographic drum,
    an automatic card feeder positioned to feed individual cards to feed rollers,
    means to drive the xerographic drum and the feed rollers,
    means to control the movement of cards into the feed rollers so that the cards are moving at the same speed as the surface of the xerographic drum when the cards contact the drum and are in registration with the powder image on the drum surface,
    and a transfer assembly positioned adjacent the drum surface near the point that the cards contact the drum and having a series of rollers extending across the drum surface, a plurality of resilient strands positioned around the rollers in pressure contact with the drum surface, to force cards into surface contact with the drum,
    means to drive the rollers so that the strands move with the drum surface and means to effect the transfer of the powder image from the drum surface to the card surface, the transfer assembly being movable into and out of contact with the drum surface.

2. A xerographic reproducing apparatus for copying images on data processing cards and the like, including a xerographic drum journaled for rotational movement,
means to produce on the surface of the xerographic drum a powder image of copy being reproduced,
a series of card feeding rollers positioned to carry cards into surface contact with the xerographic drum,
an automatic card feeder positioned to feed individual cards to the feed rollers,
means to drive the xerographic drum and the feed rollers,
means to control the movement of cards through the feeder so that the cards are moving at the same speed as the surface of the xerographic drum when the cards contact the drum and are in registration with the powder image on the drum,
means to place the cards into intimate contact with the xerographic drum including a plurality of continuous strands across the surface of the xerographic drum and extending in the direction of movement of the xerographic drum, the strands being in contact with the surface of the xerographic drum a distance sufficient to press the card against the surface of the xerographic drum, and
means to transfer the powder image from the drum surface to the card surface.

3. A xerographic reproducing apparatus for copying images on data processing cards and the like, including
a xerographic drum journaled for rotational movement,
optical scanning means adapted to scan copies to be reproduced and to expose the xerographic drum to an optical image of the copy being scanned,
means to produce a powder image on the drum surface in conformance with the optical image,
card feeding means adapted to feed data processing cards and the like individually into surface contact with the xerographic drum in registration with the powder image thereon and at the same speed as the surface of the xerographic drum,
and means to conform the card to the surface of the xerographic drum during transfer of the powder image from the drum surface to the card surface, said means including a continuous strand across the surface of the xerographic drum and extending in the direction of movement of the xerographic drum, the strand being in contact with the surface of the xerographic drum a distance sufficient to press the card against the surface of the xerographic drum.

4. The apparatus in claim 3 wherein the means to conform the card to the surface of the xerographic drum is a plurality of continuous strands across the surface of the xerographic drum.

References Cited

UNITED STATES PATENTS

| 2,927,516 | 3/1960 | Hix | 95—1.7 |
| 3,045,587 | 7/1962 | Schwertz | 95—1.7 X |
| 3,206,307 | 9/1965 | Ludwig | 95—1.7 X |

JOHN M. HORAN, Primary Examiner

U.S. Cl. X.R.

88—24; 95—77.5